US00RE35382E

United States Patent [19]

Saito

[11] E Patent Number: Re. 35,382

[45] Reissued Date of Patent: Nov. 26, 1996

[54] LUBRICATION ARRANGEMENT FOR ENGINE

[75] Inventor: Tetsushi Saito, Iwata, Japan

[73] Assignee: Yamaha Hatsudoki Kabushiki Kaisha, Shizuoka-ken, Japan

[21] Appl. No.: 297,630

[22] Filed: Aug. 29, 1994

Related U.S. Patent Documents

Reissue of:

[64] Patent No.: 5,161,495
Issued: Nov. 10, 1992
Appl. No.: 833,640
Filed: Feb. 10, 1992

U.S. Applications:

[63] Continuation of Ser. No. 550,384, Jul. 10, 1990, abandoned.

[30] Foreign Application Priority Data

Jul. 14, 1989 [JP] Japan ..... 1-181893

[51] Int. Cl.[6] ..... F01M 1/06; F01M 9/10

[52] U.S. Cl. ..... 123/90.27; 123/90.33; 123/90.34

[58] Field of Search ..... 123/90.27, 90.34, 123/90.38, 195 C, 193.1, 193.3, 193.5, 90.33

[56] References Cited

U.S. PATENT DOCUMENTS

| | | | |
|---|---|---|---|
| 1,398,651 | 11/1921 | Rowledge . | |
| 1,631,410 | 6/1927 | Fornaca . | |
| 3,482,553 | 12/1969 | Buchwald | 123/90.27 |
| 4,438,734 | 3/1984 | Hayashi | 123/90.27 |
| 4,497,289 | 1/1985 | Bortolussi | 123/90.27 |
| 4,515,119 | 5/1985 | Hayashi et al. | 123/195 C |
| 4,621,597 | 11/1986 | Kawada et al. | 123/90.27 |
| 4,688,524 | 8/1987 | Takahashi | 123/90.38 |
| 4,709,667 | 12/1987 | Ichihara et al. | 123/90.34 |
| 4,729,349 | 3/1988 | Sonoda et al. | 123/90.34 |
| 4,730,588 | 3/1988 | Maeda | 123/90.6 |
| 4,741,302 | 5/1988 | Oda et al. | 123/90.23 |
| 4,773,366 | 9/1988 | Seidl et al. | 123/195 C |
| 4,823,747 | 4/1989 | Wagner et al. | 123/90.27 |
| 4,858,574 | 8/1989 | Fukuo et al. | 123/90.34 |
| 4,881,497 | 11/1989 | Matayoshi et al. | 123/90.34 |
| 4,911,120 | 3/1990 | Sumi | 123/90.38 |
| 4,928,641 | 5/1990 | Nizzato et al. | 123/90.16 |
| 4,942,855 | 7/1990 | Muto | 123/90.33 |
| 4,957,079 | 9/1990 | Nakatani et al. | 123/90.34 |

(List continued on next page.)

FOREIGN PATENT DOCUMENTS

| | | |
|---|---|---|
| 212981 | 8/1986 | European Pat. Off. . |
| A10263734 | 4/1988 | European Pat. Off. . |
| 2552820 | 10/1984 | France . |
| 2342530 | 6/1982 | Germany . |
| 3641129C1 | 7/1987 | Germany . |
| 3743854 | 12/1987 | Germany . |
| 411700A1 | 11/1991 | Germany . |
| 3604666 | 10/1992 | Germany . |
| 5-14081 | 8/1984 | Japan . |
| 2181486 | 4/1987 | United Kingdom . |
| 2193998 | 2/1988 | United Kingdom . |
| 2197686 | 5/1988 | United Kingdom . |
| 2199894 | 7/1988 | United Kingdom . |

OTHER PUBLICATIONS

Service Manual for Yamaha FZ750 (Mar. 1985).

*Primary Examiner*—Thomas N. Moulis
*Attorney, Agent, or Firm*—Knobbe, Martens, Olson & Bear

[57] ABSTRACT

A lubrication arrangement for an engine and more particularly to an arrangement for lubricating the valve train of an engine. The valve train includes a cylinder head that journals an intake and an exhaust camshaft through bearings formed in the cylinder head and the cam cover. Hydraulic lash adjusters are associated with each of the camshafts and there are more intake adjusters than exhaust adjusters. An arrangement is provided for delivering lubricant to the lash adjusters and the camshaft journals which includes a passageway formed in the cam cover. Lubricant is delivered to the cylinder head in proximity to the intake adjusters so that the intake adjusters and the exhaust adjusters will receive lubricant at substantially the same pressure.

38 Claims, 7 Drawing Sheets

U.S. PATENT DOCUMENTS

| | | | |
|---|---|---|---|
| 5,016,592 | 5/1991 | Onodera | 123/432 |
| 5,031,586 | 7/1991 | Masuda et al. | 123/90.27 |
| 5,052,351 | 10/1991 | Nishimura et al. | 123/90.34 |
| 5,080,057 | 1/1992 | Batzill et al. | 123/90.27 |
| 5,111,791 | 5/1992 | Onodera | 123/432 |
| 5,121,718 | 6/1992 | Saito | 123/90.27 |
| 5,123,385 | 6/1992 | Sado et al. | 123/90.34 |
| 5,150,675 | 9/1992 | Murata | 123/90.38 |
| 5,207,197 | 5/1993 | Klingmann et al. | 123/90.27 |
| 5,213,071 | 5/1993 | Iwata et al. | 123/90.27 |
| 5,220,853 | 6/1993 | Sado et al. | 123/90.34 |
| 5,339,778 | 8/1994 | Reckzugel et al. | 123/193.5 |
| 5,351,663 | 10/1994 | Makimura et al. | 123/90.27 |

LUBRICATION ARRANGEMENT FOR ENGINE

Matter enclosed in heavy brackets [ ] appears in the original patent but forms no part of this reissue specification; matter printed in italics indicates the additions made by reissue.

This is a continuation of U.S. patent application Ser. No. *07*/550,384, filed Jul. 10, 1990, now abandoned.

BACKGROUND OF THE INVENTION

This invention relates to a lubrication arrangement for an engine and more particularly to an arrangement for lubricating and supplying lubricant to certain components of the valve actuating mechanism for an engine.

The use of overhead valves operated by overhead mounted camshafts is well known. Although there are some advantages to direct valve actuation, the use of a rocker arm actuator has the advantage of permitting the incorporation of a hydraulic lash adjuster. Conventionally it has been the practice to supply lubricant to the lash adjusters for their operation and to the journals of the associated camshaft in a series flow relationship. Although this has the advantage of simplicity, it has certain disadvantages. Specifically, with a series flow arrangement when the engine is turned off, the fact that the camshaft journals are open to the atmosphere will cause leak down of the lubricant. That is, because the cam journals are generally open, the system does not maintain pressure and lubricant can drain down back through the series flow arrangement into the lubricant reservoir through the oil pump. This means that the lubricant in the lifters will become depleted when the engine is shut down. This can give rise to obvious difficulties on restarting.

It is, therefore, a principal object of this invention to provide an improved lubricating system for an engine and for supplying lubricant to hydraulic lash adjusters.

It is a further object of this invention to provide a lubricating system for an engine, including hydraulic lash adjusters wherein the leak down of the lash adjusters when the engine is shut off is substantially reduced.

As has been previously noted, the normal arrangement for an engine having a camshaft and hydraulic lash adjusters is to supply lubricant through a common conduit from the lubricant pump to the lash adjusters and the cam journals. Frequently the engine may employ two camshafts, each of which operates its own series of valves through an actuating mechanism that includes its own series of lash adjusters. With the type flow arrangement previously proposed, the pressure of the lubricant supplied to the lash adjusters will depend upon its distance from the lubricant pump and this means that the adjusters associated with one camshaft may receive lubricant at a substantially lower pressure than those associated with the other camshaft.

It is, therefore, a still further object of this invention to provide a lubricating system for an engine having a pair of camshafts and lash adjusters associated with each of them wherein the lash adjusters are all supplied with substantially the same pressure.

In an arrangement incorporating a system for precluding leak down of the hydraulic lifters, a still further problem can result, particularly where the arrangement utilizes two camshafts and a plurality of lifters associated with it. Frequently, the arrangement is such that each cylinder of the engine is provided with different numbers of intake and exhaust valves. Where this is the case, a greater number of hydraulic lash adjusters may be associated with one camshaft than the other. This further aggravates the problems already discussed.

It is, therefore, a further object of this invention to provide a lubricating system for an engine embodying two camshafts, each of which operates a different number of hydraulic lash adjusters and wherein all of the lash adjusters will be supplied with substantially the same pressure.

In connection with valve arrangements of the type already described, it is generally necessary to deliver oil to the camshafts through the cylinder block and cylinder head. The camshafts are conventionally journaled on the cylinder head by bearing surfaces formed integrally with the cylinder head and separate bearing caps that are affixed to the cylinder head. With such an arrangement, it is generally the practice to deliver the oil to one end of the camshaft by means of a passage that is formed in the cylinder head and this obviously adds to the length of the engine. Also, the internal passages of the cylinder head may, itself, present certain problems in connection with maintaining a compact construction.

It is, therefore, a still further object of this invention to provide an improved arrangement for delivering lubricant to the camshafts of an overhead cam internal combustion engine, wherein certain of the delivery passages are formed externally of the cylinder head.

SUMMARY OF THE INVENTION

A first feature of this invention is adapted to be embodied in a valve arrangement for an internal combustion engine having a camshaft journaled for rotation about at least one bearing. At least one valve is operated by the camshaft by a valve actuating system that includes a hydraulically operated lash adjuster. A lubricating system is provided for supplying lubricant to the lash adjuster for its operation and to the bearing for lubrication of the camshaft. This lubricating system includes a lubricant pump and conduit means for supplying lubricant under pressure from the pump to the hydraulically operated lash adjuster and to the bearing in parallel flow relationship to minimize leak down of the lash adjuster when the engine is stopped.

Another feature of the invention is adapted to be embodied in a valve arrangement for an engine that has first and second camshafts, each journaled for rotation about respective first and second axes by first and second bearings. A first plurality of valves are operated from the first camshaft by means including a first plurality of lash adjusters, each associated with a respective one of the first plurality of valves, A second plurality of valves are operated from the second camshaft by means including a second plurality of hydraulic lash adjusters each associated with a respective one of the second plurality of valves. A lubricant pump is provided for supplying lubricant under pressure and a first series flow hydraulic conduit supplies lubricant to the first plurality of hydraulic lash adjusters for their operation. A second series hydraulic conduit supplies the second plurality of hydraulic lash adjusters with lubricant for their operation. There are more lash adjusters in the first series than in the second series. A third series hydraulic conduit supplies lubricant to the camshaft bearings. The first series hydraulic conduit is connected to the third series conduit contiguous to the first bearing. The second series hydraulic conduit is connected to the third series conduit contiguous to the second bearing. A supply conduit delivers lubricant under pressure from the lubricant pump to the third series hydraulic conduit closer to the first bearing than to the second bearing so that the hydraulic pressure applied to all of the hydraulic lash adjusters is substantially equal.

A further feature of the invention is adapted to be embodied in a camshaft lubrication system for an overhead valve engine having a cylinder head assembly, a camshaft journaled by the cylinder head assembly in spaced bearings, and a camshaft cover affixed to the cylinder head assembly and enclosing the camshaft. In accordance with this feature of the invention, a lubricant supply passage is formed in both the cylinder head assembly and cam cover for delivering lubricant to the camshaft bearings for their lubrication.

DETAILED DESCRIPTION OF THE PREFERRED EMBODIMENTS OF THE INVENTION

Figure 1:
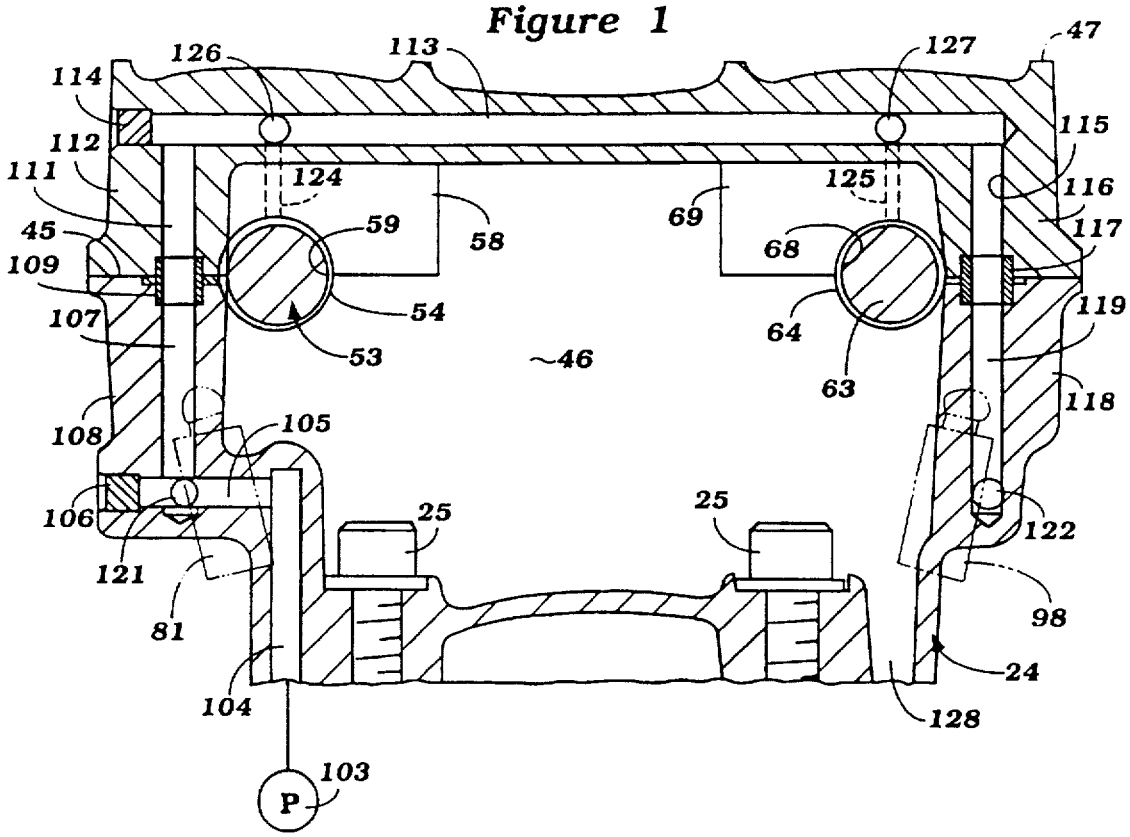
FIG. 1 is a transverse cross sectional view taken through a cylinder head assembly constructed in accordance with an embodiment of the invention and is taken generally along the line 1—1 of FIG. 5.

Referring now in detail to the drawings and initially primarily to FIG. 1, a multiple cylinder internal combustion engine, constructed in accordance with an embodiment of the invention is identified generally by the reference numeral 21. The engine 21 includes a cylinder block which may be conventional and hence is only shown in phantom in FIG. 3 in which a plurality of aligned bores 23 are formed. In the illustrated embodiment, the engine 21 is of the four cylinder in line type. It should be readily apparent, however, to those skilled in the art how the invention can be practiced in conjunction with engines having other numbers of cylinders and other cylinder configurations.

Since the invention deals primarily with the cylinder head assembly and more particularly to the valve actuating mechanism therefor, the details of the cylinder block, pistons and running component of the engine which may be considered to be conventional are not believed to be necessary to enable those skilled in art to practice the invention. Therefore, the cylinder head and valve train assembly and lubrication system therefor will now be described by particular reference to FIGS. 1, 4, 5 and 10 in addition to FIG. 3.

A cylinder head assembly, indicated generally by the reference numeral 24 is affixed to the cylinder block 22 by means of a plurality of fasteners 25 that pass through appropriate openings in the cylinder head 24 and which are threaded into threaded openings in the cylinder block. It should be noted that the fasteners 25 are disposed so that they will be located at the four corners of the cylinder bores 23, as indicated by the broken circles in FIG. 5, to show the relationship of these fasteners 25 to the cylinder bores 23.

The lower face of the cylinder head 24 is provided with a plurality of recesses 26 which have a generally pent roof configuration, as will be described. Three intake valves comprised of a pair of center intake valves 27 and 28 and a side intake valve 29 are supported for reciprocation within the cylinder head 24 by respective valve guides 31. It will be noted that the intake valves 27, 28 and 29 are oriented so that the center intake valves 27 and 28 reciprocate along axes $Y_1$ that are disposed at a relatively large acute angle $\alpha_2$ to a plane $A_1$ (FIG. 10) containing the cylinder bore axis $X_2$ and extending parallel to the axis of rotation of the associated crankshaft.

Figure 3:
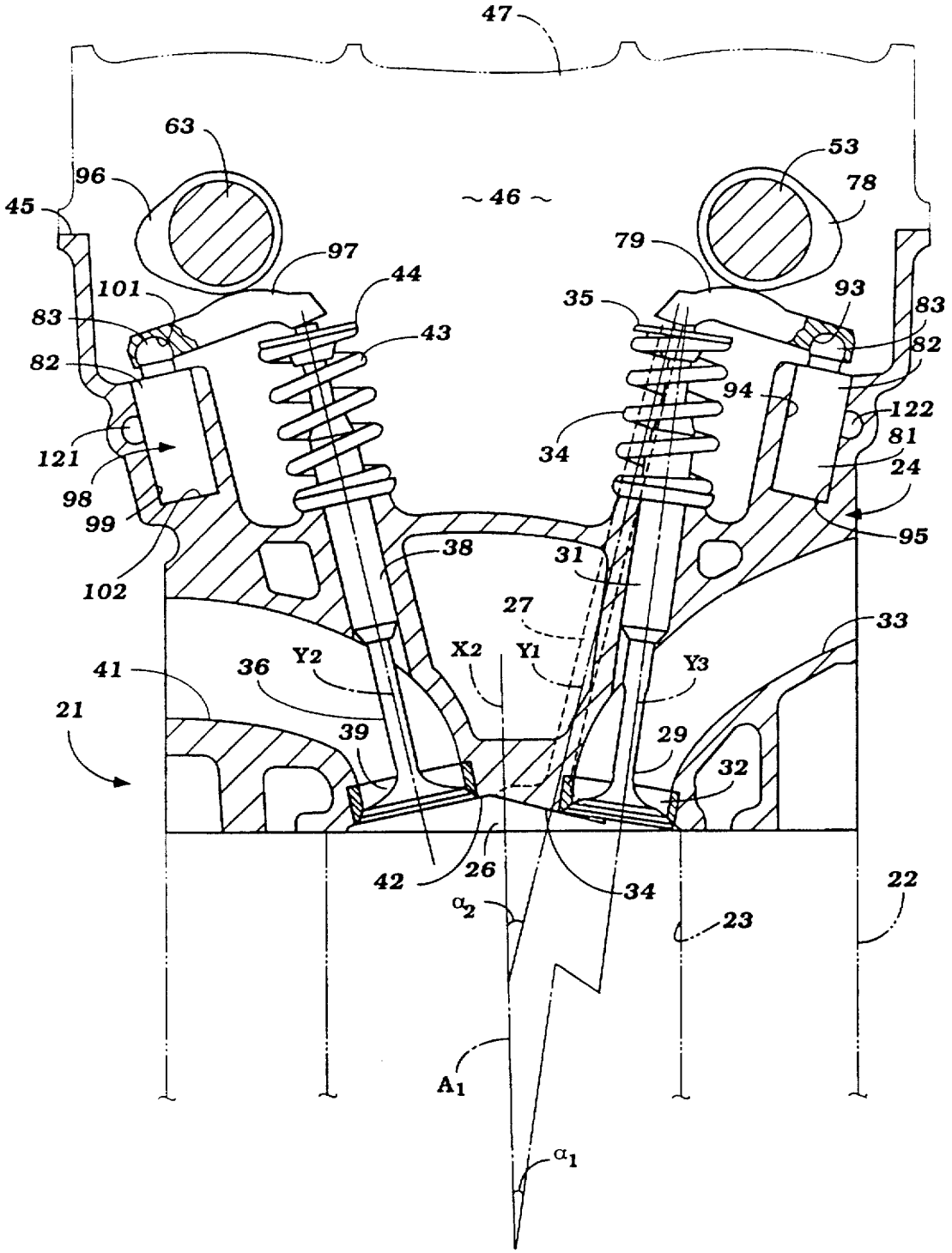
FIG. 3 is a partial cross sectional view taken generally along the line 3—3 of FIG. 5, showing the cylinder block and cam cover in phantom.
Figure 4:
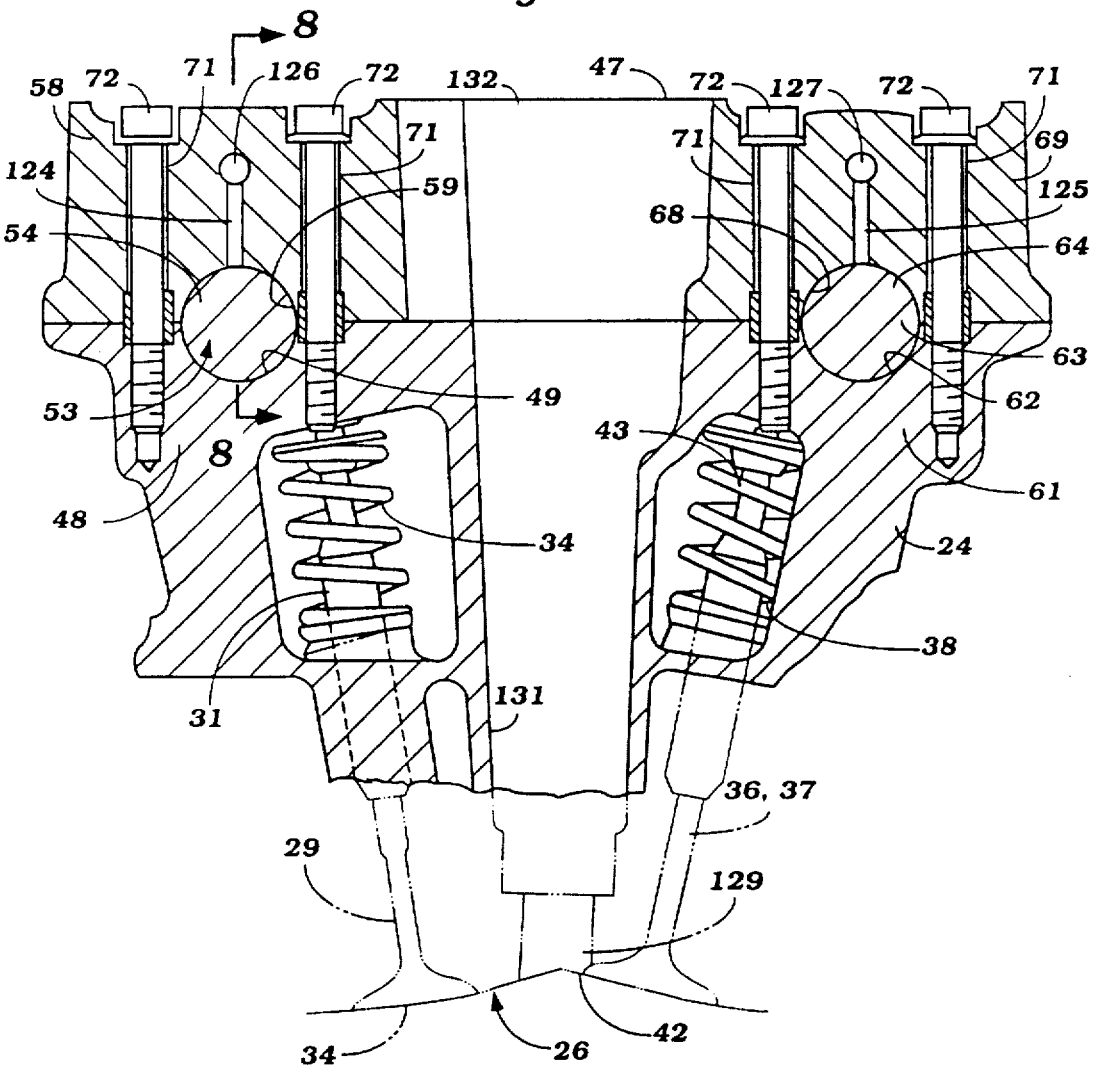
FIG. 4 is a cross sectional view taken along the line 4—4 of FIG. 5, with a portion of the cylinder head assembly shown in phantom.
Figure 5:
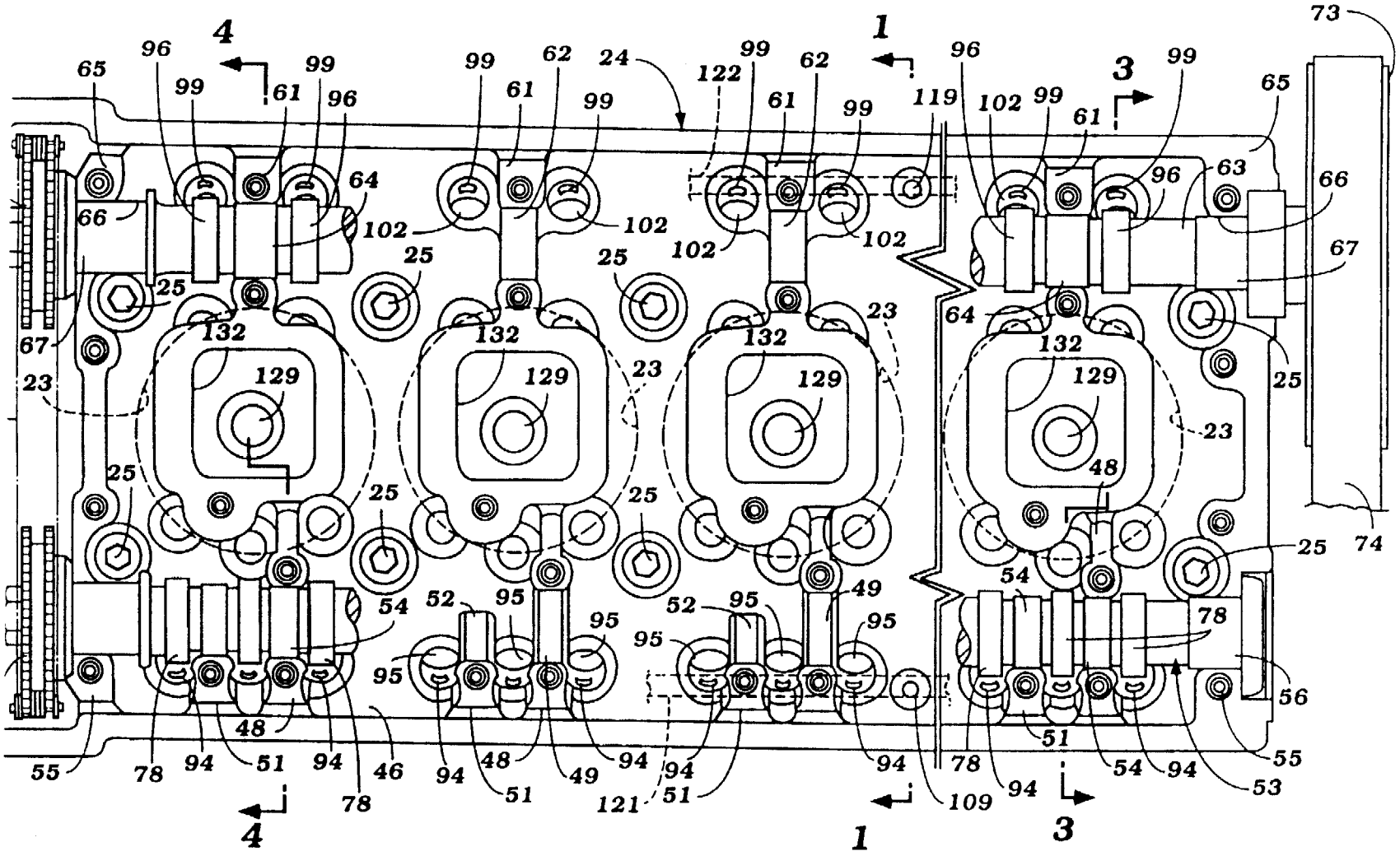
FIG. 5 is a top plan view of the cylinder head assembly with the cam cover removed and portions of the camshafts broken away.

The side intake valve 29 reciprocates about an axis $Y_3$ which is disposed at a lesser acute angle to this plane, this angle being indicated at $\alpha_1$ in FIG. 3. This angular relationship and the reason for it is more fully described in my copending application entitled "Valve Actuating Arrangement For Engine", Ser. No. 07/550,383, filed Jul. 10, 1990 and assigned to the Assignee of this application. That disclosure is incorporated herein by reference. For that reason, it will not be described in more detail.

Each of the intake valves 27, 28 and 29 cooperates with a respective valve seat 32 pressed into the cylinder head 24 and defining an intake port at the termination of an intake passage 33 which extends through one side of the cylinder head. The intake passages 33 may be siamese so that one intake opening in the side of the cylinder head cooperates with each of the valve seats 32 or, alternatively, separate passages may be formed for each valve seat. The orientation of the heads of the valves 27, 28 and 29 gives the lower surface of the cylinder head cavity 26 a generally inclined portion 34 which extends across the plane $A_1$ so that a portion of the heads of the valves 27 and 28 lies on the opposite side of this plane when the valves are closed, as clearly shown in FIG. 10.

Coil compression springs 34 encircle the stems of the valves 27, 28 and 29 and act against keeper retainer assemblies 35 for urging the valves 27, 28 and 29 to their closed positions. The mechanism for opening the intake valves 27, 28 and 29 will be described later.

A pair of exhaust valves 36 and 37 are supported for reciprocation on the other side of the plane $A_1$ by valve guides 38 which are pressed into the cylinder head assembly 24. The exhaust valves 36 and 37 reciprocate about respective axes $Y_2$ which are disposed at an acute angle to the plane $A_1$ which angle is less than the angle $\alpha_2$ and greater than the angle $\alpha_1$. The exhaust valves 36 and 37 cooperate with respective valve seats 39 that are pressed into the cylinder head 24 and which form the exhaust ports of exhaust passages 41 that extend through the side of the cylinder head 24 opposite to the intake side. As with the intake passages 33, the exhaust passages 41 may be separate or siamese. It should be noted that the disposition of the heads of the exhaust valves 36 and 37 gives rise to the combustion chamber cavity having a generally inclined surface 42 that intersects the surface 34 on the exhaust side of the plane $A_1$ so that this intersection is slightly offset to the side of the combustion chamber.

Coil compression springs 43 cooperate with keeper retainer assemblies 44 on the stems of the exhaust valves 36 and 37 for urging the exhaust valves 36 and 37 to their closed positions.

The relationship of the axes $Y_2$ of the exhaust valves 36 and 37 is as described in more detailed in my aforenoted copending application Ser. No. 07/550,383. For that reason, further description is believed to be unnecessary, since this particular orientation is not the subject matter of this application.

The mechanism for opening the intake valves 27, 28 and 29 and exhaust valves 36 and 37 against the operation of the respective springs 34 and 43 will now be described. The cylinder head 24 has an upstanding peripheral wall that defines an upwardly facing sealing surface 45 that defines in part a cavity 46 in which the valve actuating mechanism is contained. The cavity 46 is enclosed by means of a cam cover 47 that is affixed to the cylinder head 24 in a manner as will be described. On the intake side of the cylinder head 24 there is provided a plurality of bosses 48 which define generally semi cylindrical shaped bearing surfaces 49. Adjacent the bosses 48, there are provided further bosses 51 that define quarter cylindrical bearing surfaces 52. An intake camshaft, indicated generally by the reference numeral 53 has spaced bearing surfaces 54 that are received within and journaled on the cylinder head bearing surfaces 49 and 52. The cylinder head 24 further has end bosses 55 that define further semi cylindrical bearing surfaces with which bearing portions 56 of the camshaft 53 cooperate so as to rotatably journal it. Unlike conventional arrangements wherein separate bearing caps are provided, in accordance with a feature of the invention, the cam cover 47 has a plurality of inwardly extending portions 58 that define semi cylindrical bearing surfaces 59 which cooperate with the camshaft bearing surfaces 54 and 56, respectively, so as to complete the journaling of the intake camshaft 53 in the cylinder head assembly The exhaust side of the cylinder head assembly 47 also has a plurality of inwardly extending bosses 61 which have respective bearing surfaces 62 which are of a semi cylindrical configuration. An exhaust camshaft 63 is rotatably journaled on these bearing surfaces by means of bearing portions 64 formed integrally thereon. In addition, end walls 65 of the cylinder head 24 are provided with bearing surfaces 66 which cooperate with end bearing surfaces 67 on the exhaust camshaft 63 for its rotational support. It should be noted that the intake camshaft 53 and exhaust camshaft 63 rotate about parallel axes which are parallel to the axis of rotation of the associated crankshaft.

Cooperating with the cylinder head bearing surfaces 62 and 66 are bearing surfaces 68 formed in inwardly extending portions 69 of the cam cover 47.

Figure 6:
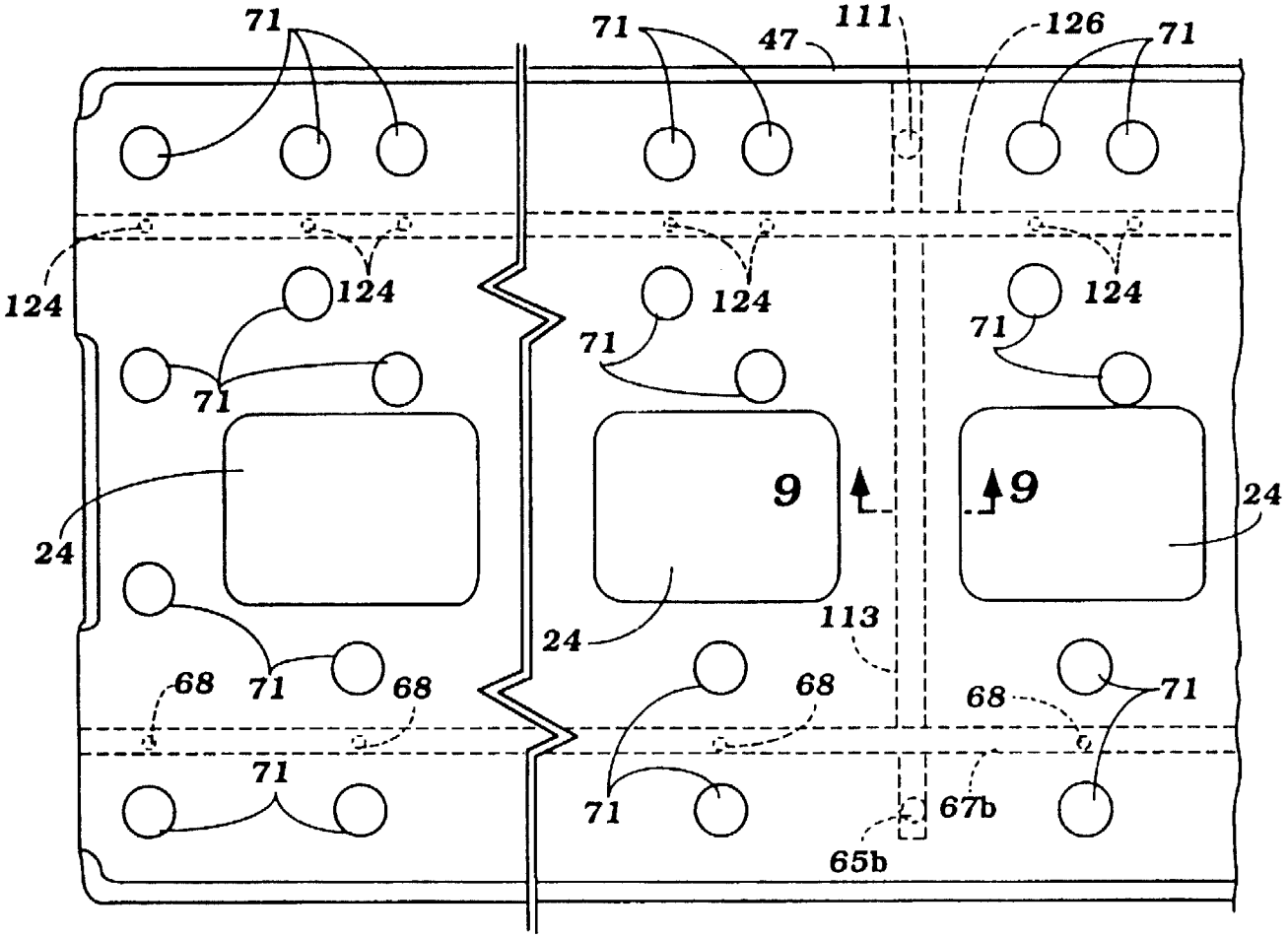
FIG. 6 is a top plan view of the cam cover.

The cam cover 47 is provided with a plurality of appropriately spaced bolt clearance holes 71 that are positioned in a pattern as best shown in FIG. 6, and which receive bolts 72 that are threaded into tapped openings formed in the cylinder head 24 so as to secure the bearing caps formed by the cam cover 47 and the cam cover in place. Because of this construction, the head assembly may be made more compact than prior art arrangements and also the use of separate bearing caps for the camshaft may be avoided.

A toothed sprocket 73 (FIG. 5) is affixed to one exposed end of the exhaust camshaft 63 and is driven by a toothed belt 74 in timed relationship with the engine crankshaft (not shown). At the opposite end of the exhaust camshaft 63, and within the cylinder head assembly 24, there is affixed a sprocket 75. A chain 76 encircles the sprocket 75 and drives a sprocket 77 that is affixed to the intake camshaft 53 at this end. In this way, the intake and exhaust camshafts will be driven in timed relationship from the engine output shaft.

Figure 2:
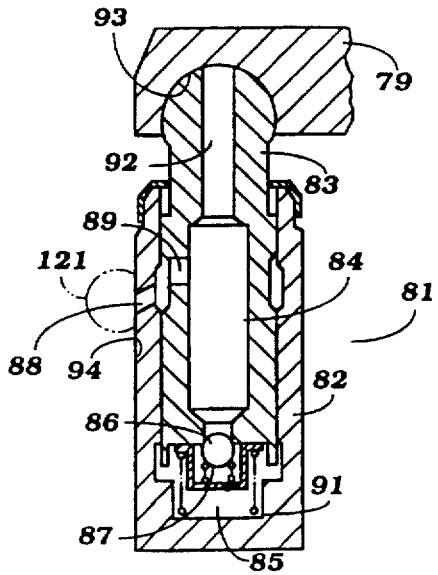
FIG. 2 is an enlarged cross sectional view of one of the hydraulic lash adjusters.

In order to operate the intake valves 27, 29 and 28, there are provided three cam lobes 78 on the intake camshaft 53 for each cylinder. One of the cam lobes 78 is disposed between the bearing surfaces 49 and 52 and the camshaft bearing surfaces 54. The other of the cam lobes 78 are positioned outwardly of these bearing surfaces. Individual rocker arm assemblies 79 (FIGS. 2 and 3) have an intermediate portion that is engaged by the cam lobe 78 and an end portion that is engaged with the stem of the respective intake valve 27, 28 and 29. The rocker arms 79 are pivotally supported by means of a hydraulically operated lash adjuster, indicated generally by the reference numeral 81 and having a construction as best shown in FIG. 2.

Each lash adjuster 81 comprises a cylindrical body portion 82 having an internal bore in which a tappet member 83 is slidably supported. The tappet member 83 has a hollow central portion 84 which communicates with a pressure chamber 85 positioned at the bottom of the adjuster body 82 through a passageway 86 in which a spring biased check valve 87 is positioned. Hydraulic pressure is delivered to the central interior 84 of the adjusting member from a delivery passage 88 formed in the body 82 and a delivery passage 89 formed in the tappet 83. The hydraulic pressure acts under the tappet 83 so as to hold the clearance in the system to zero clearance. A light compression spring 91 also acts to hold the tappet 83 in position when the engine is not running.

A further passage 92 extends through the tappet 83 and communicates with a spherical socket 93 formed in the rocker arm 79 for lubrication. A delivery passage, to be described, supplies oil to the lash adjuster 81 for the aforedescribed operation.

The bores in which the adjusters 81 are positioned are indicated by the reference numeral 94 and are oriented as described in my aforenoted copending application. These bores terminate in lower shoulders 95 against which the adjuster bodies 82 react.

The exhaust camshaft 63 is provided with pairs of cam lobes 96 that are disposed on opposite sides of their bearing portions 64 so as to operate the exhaust valves 36 and 37. These cam lobes 96 cooperate with intermediate portions of exhaust rocker arms 97 which have one end portion engaged with the stems of the valves 36 and 37 for operating them. The opposite ends of the rocker arms 97 cooperate with hydraulic lash adjusters 98 which have an internal construction the same as those associated with the intake valves (lash adjusters 81). For this reason, the description of the exhaust lash adjusters 98 is not believed to be necessary.

However, these adjusters 98 are received in bores 99 configured as described in my aforenoted copending application and which have their tappets 83 cooperating with spherical recesses 101 in the rocker arms 97. The base of the bores 99 is formed with a surface 102 against which the adjuster body reacts.

Figure 7:
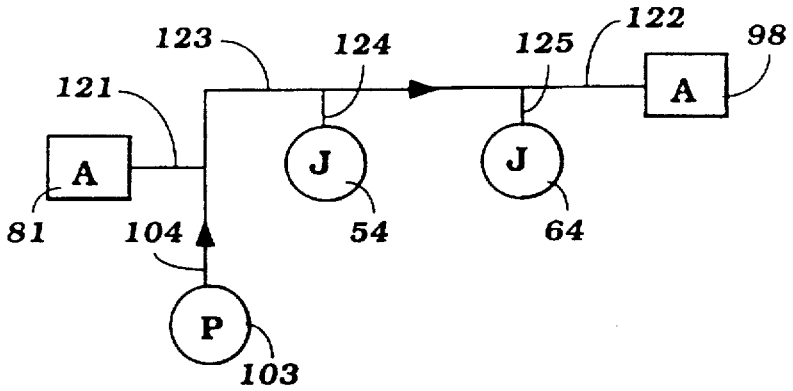
FIG. 7 is a schematic view showing how the lubricant system is related to the cam bearing journals and the hydraulic lash adjusters.
Figure 8:
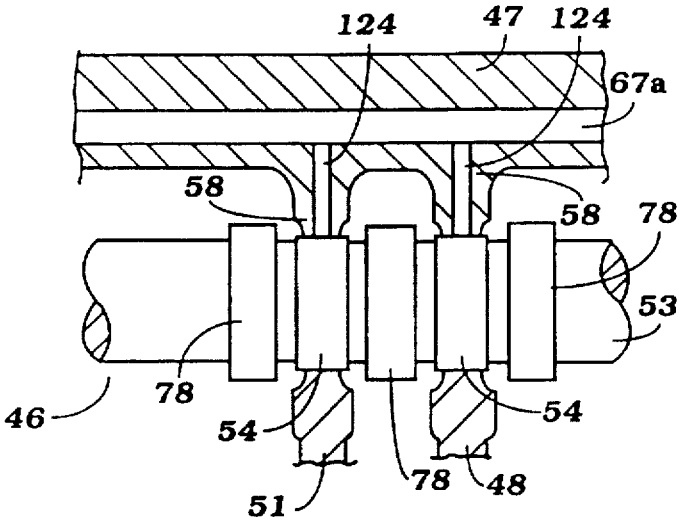
FIG. 8 is a cross sectional view taken along the line 8—8 of FIG. 4.

The engine 21 is provided with a lubricating system that includes an oil reservoir which may be of either the wet or dry sump type and at least a pressure pump, indicated generally by the reference numeral 103 in FIGS. 1 and 7.

The pump 103 is driven from the engine output shaft in a suitable manner and lubricates the crankshaft and components associated with the cylinder block in a well known manner. In accordance with the invention, this lubrication system includes a passageway that extends through the cylinder block 22 and which cooperates with a main oil delivery passage 104 (FIG. 1) that extends upwardly through the lower face of the cylinder head 24 between a pair of cylinders thereof. The passageway 104 is, in the illustrated embodiment, on the intake side of the cylinder head 24 for a reason to be described. A cross drilled passageway 105 intersects the passage 104 and is closed by a closure plug 106. A further drilled passageway 107 extends down from the cylinder head sealing surface 45 through a side wall 108 of the cylinder head and intersects the passageway 105. A sleeve 109 is pressed into this passageway and cooperates with a corresponding passageway 111 formed in a side wall 112 of the cam cover 47.

A cross drilled passageway 113 extends transversely across the cam cover 47 as shown in FIGS. 1 and 6, and intersects the passageway 111. This cross drilled passageway 113 is closed at its outer end by means of a closure plug 114.

A further passageway 115 is drilled in the opposite wall 116 of the cam cover 47 and cooperates with a sleeve 117 that is pressed into a side wall 118 of the cylinder head 24 around a further oil passageway 119 which is likewise drilled in the cylinder head 24.

The passageway 105 at the intake side of the cylinder head assembly is intersected by a transversely extending oil gallery 121 which intersects the bores 94 in which the lash adjusters 81 are slidably supported adjacent the delivery ports 88. Hence, there is defined a series flow oil delivery for supplying lubricant under pressure to the intake adjusters 81.

In a similar manner, a gallery 122 is drilled in the opposite wall 118 of the cylinder head and intersects the bores 99 in which the exhaust valve adjusters 98 are positioned. Since the intake oil gallery 121 is closer to the source of oil pressure, there is a greater likelihood that uniform pressure will be delivered to both the intake adjusters 81 and exhaust adjusters 98, bearing in mind the fact that there are more intake adjusters than exhaust adjusters, and thus the system will operate at a more uniform pressure. Also, because of the fact that the adjuster galleries 121 and 122 are served off the main oil delivery comprised of the passageways 104, 105, 107, 111, 113, 115 and 119, rather than in series flow relationship with the camshaft journals, to be described, leakage caused by the opening of the camshaft journals to the atmosphere will not cause the adjusters 81 and 98 to leak down as rapidly as with conventional series flow arrangements.

This concept may be best understood by reference to FIG. 7 where the main oil gallery aforereferred to is identified by the reference numeral 123. As may be seen in this Figure, intake camshaft delivery passages 124 intersect this main gallery 123 and exhaust camshaft delivery passages 125 also intersect this gallery. As may be seen in FIGS. 1, 4, 6, 7 and 8, these passages extend through the bosses 58 and 69 of the cam cover 47 for lubricating these journals. The passageways 124 are all supplied with lubricant from a cross drilled passageway 126 that extends along the cam cover 47 and which is closed at one end thereof by means of a plug (not shown). In a like manner, a drilled passageway 127 that extends parallel to the passageway 126 intersects the passageways 125 and supplies lubricant to the for the exhaust camshaft journals 64.

It should be readily apparent that the described construction insures that there will be adequate lubrication for the camshaft journals and also adequate lubrication supplied to the hydraulic lash adjusters 81 and 89 and the pressure will be substantially uniform throughout the system. Also, because the oil delivery passages are formed in the cam cover 47, the overall engine construction may be made more compact. Furthermore, since the delivery to the gallery 121 for the more numerous intake lash adjusters 81 is closer to it than that for the exhaust gallery 122, there will not be a substantial pressure difference between the intake and exhaust adjusters.

As may be seen in FIG. 1, one or more oil drain passageways 128 are formed in the cylinder head 24 for draining lubricant back to the crankcase of the engine.

Figure 9:
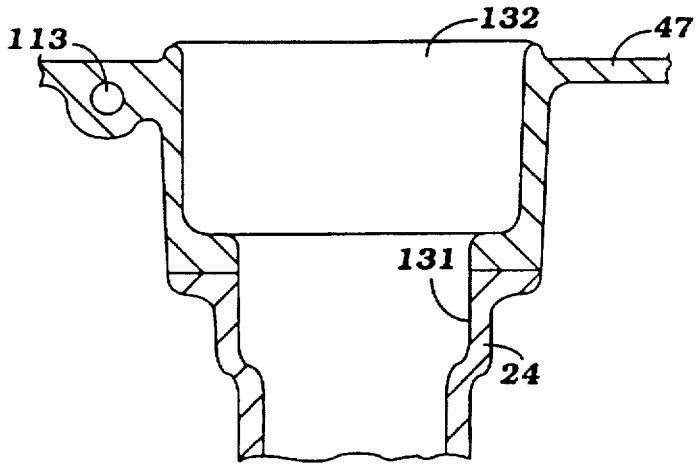
FIG. 9 is a cross sectional view taken along the line 9—9 of FIG. 6.
Figure 10:
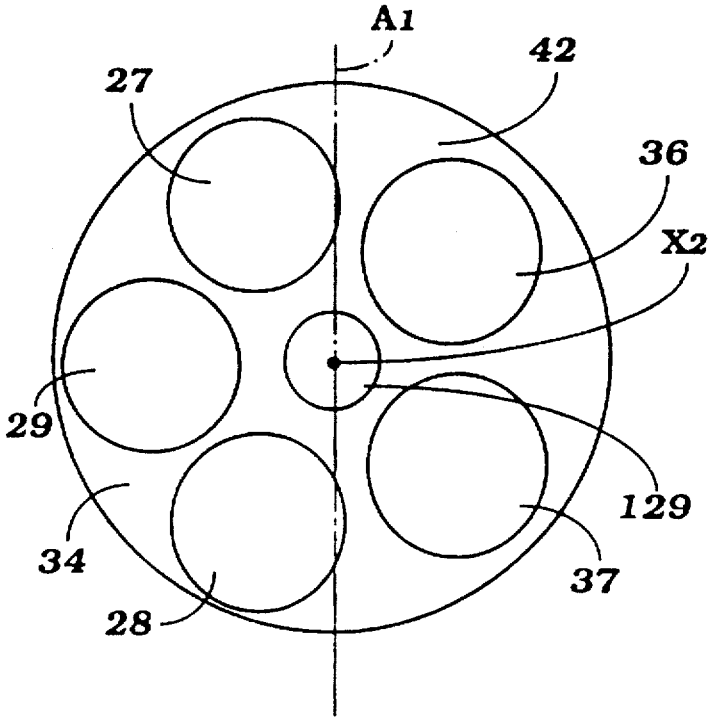
FIG. 10 is a bottom plan view of the combustion chamber.

Each combustion chamber of the engine is provided with a single spark plug for firing the charge therein. The cylinder head 24 is provided with a tapped opening 129 for receiving the spark plug. This tapped opening is formed at the base of the larger opening 131. The cam cover has an even larger opening 132 for accessing these spark plugs. This construction appears best in FIG. 9.

Figure 11:
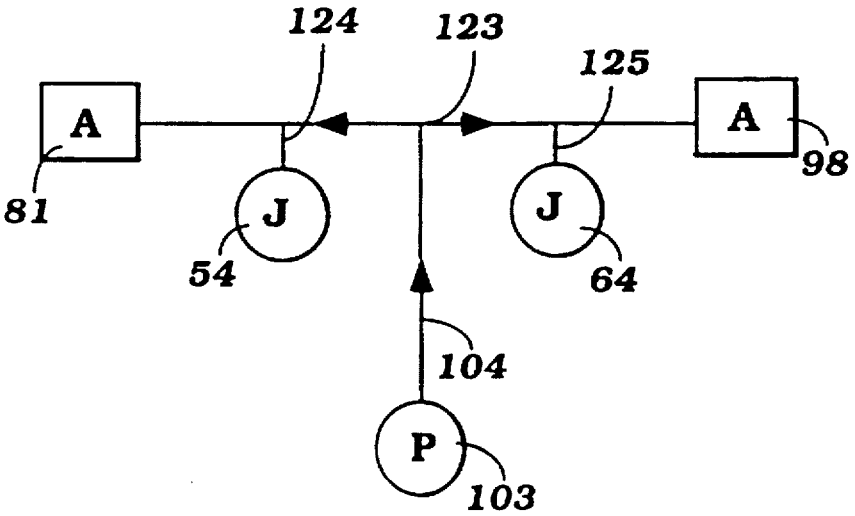
FIG. 11 is a schematic view of the lubricating system, in part similar to FIG. 7, but shows another embodiment of the invention.

In the embodiment of the invention as thus far described, the oil delivery for the system has been closer to the intake gallery 121 than the exhaust adjuster gallery 122 because there are a greater number of intake adjusters than exhaust adjusters. However, the arrangement can be utilized in conjunction with a system wherein the delivery is intermediate the ends, as shown schematically in FIG. 11 with such a system being more properly adapted for use with engines having a like number of intake and exhaust valves or a like number of intake and exhaust valve hydraulic adjusters.

It should be understood that the foregoing description is that of preferred embodiments of the invention. Various changes and modifications may be made without departing from the spirit and scope of the invention, as-defined by the appended claims.

I claim:

1. A valve arrangement for an internal combustion engine comprising a cylinder head having a first series of hydraulic lash adjusters for the operation of a first series of valves, a second series of hydraulic lash adjusters for operating a second series of valves, there being more hydraulic lash adjusters in said first series [then] *than* in said second series, an oil pump, first conduit means extending to said first series of adjusters for operating said first series of adjusters, second conduit means extending to said second series of adjusters for operating said second series of adjusters, means for communicating said first conduit means and said second conduit means with said oil pump, the length of the conduit from said oil pump to the first [adjustor] *adjuster* of said first series of adjusters being shorter than the length of the conduit from said oil pump to the first [adjustor] *adjuster* of said second series of adjusters.

2. A valve arrangement as set forth in claim 1 further including at least one camshaft journaled for rotation about at least one bearing and operating at least said first series of hydraulically operated lash adjusters, and, third conduit means for supplying lubricant to said bearing for lubrication, said conduit means for supplying lubricant under pressure from said pump said first, second and third conduit means being in parallel flow relationship to minimize leak down of said adjusters when said engine is stopped.

3. A valve arrangement as set forth in claim 2 wherein there are a plurality of camshaft bearings.

4. A valve arrangement as set forth in claim 3 wherein the bearings are lubricated in series and the adjusters of each series are lubricated in series.

5. A valve arrangement as set forth in claim 4 further including a pair of camshafts, each having a plurality of bearings and each operating a respective series of adjusters, the lubricant being supplied to the camshaft bearings being supplied in a series flow relationship with the lubricant being supplied to the adjusters associated with each of the camshafts in parallel flow relationship with the individual adjusters associated with each camshaft being lubricated in a series flow relationship.

6. A valve arrangement as set forth in claim 5 wherein the camshafts are journaled within a cavity formed by a cylinder head and wherein the cavity is closed by a cam cover, at least a portion of the lubricant conduit means being formed in the cam cover.

7. A valve arrangement as set forth in claim 6 wherein the camshaft bearings are formed in part by the cam cover and the conduitry delivering the lubricant to the camshaft bearings is formed in the cam cover.

8. A valve arrangement as set forth in claim 7 wherein the lubricant conduits for supplying the adjusters are formed in the cylinder head and the cylinder head has passages communicating with the cam cover for communicating the cam cover lubricant passages with the cylinder head lubricant passages, the lubricant pump delivering lubricant to the engine through the cylinder head.

9. A valve arrangement for an engine comprising a first camshaft journaled for rotation about a first axis by at least a first bearing, a second camshaft journaled for rotation about a second axis by at least a second bearing, a first plurality of valves operated from said first camshaft by means including a first plurality of hydraulic lash adjusters, each associated with a respective one of said first plurality of valves, a second plurality of valves, operated from said second camshaft by means including a second plurality of hydraulic lash adjusters, each associated with a respective one of said second plurality of valves, a lubricant pump for supplying lubricant under pressure, a first series hydraulic conduit for supplying lubricant to said first plurality of hydraulic lash adjusters for their operation, a second series hydraulic conduit for supplying said second plurality of hydraulic lash adjusters with lubricant for their operation, said first series of hydraulic lash adjusters including a greater number of lash adjusters than said second series, a third series hydraulic conduit for supplying lubricant to said camshaft bearings, said first series hydraulic conduit being connected to said third series hydraulic conduit contiguous to said first bearing, said second series hydraulic conduit being connected to said third series hydraulic conduit close to said second bearing, and a supply conduit for delivering lubricant under pressure from said lubricant pump to said third series hydraulic conduit closer to said first bearing than to said second bearing so that the hydraulic pressure applied to all of said hydraulic lash adjusters is substantially equal.

10. A valve arrangement as set forth in claim 9 in combination with a cylinder head assembly for journaling the camshafts and slidably supporting the lash adjusters.

11. A valve arrangement as set forth in claim 10 wherein there are three adjusters per cylinder associated with the first camshaft and two adjusters per cylinder associated with the second camshaft.

12. A valve arrangement as set forth in claim 11 wherein there are a plurality of cylinders associated with the cylinder head.

13. A valve arrangement as set forth in claim 12 wherein the first and second series hydraulic conduits are formed in the cylinder head.

14. A valve arrangement as set forth in claim 13 wherein at least a portion of the third series hydraulic conduit is formed in a cam cover closing a cavity formed in the cylinder head in which the camshafts are journaled.

15. A valve arrangement as set forth in claim 14 wherein the bearings are formed at least in part by the cam cover and the third series conduit terminates in each of said cam cover bearing surfaces.

16. A cylinder head and cam cover assembly comprising a cylinder head defining a cavity in which a camshaft is journaled for rotation, a cam cover affixed to said cylinder head and enclosing said cavity, and means for delivering lubricant to the components of the cylinder head for their lubrication including a conduit formed at least in part in said cylinder head and in said cam cover.

17. A cylinder head as set forth in claim 16 wherein the cylinder head defines a cavity in which a pair of camshafts are journaled for rotation about respective parallel extending axis and the cam cover conduit supplies lubricant to each of said camshafts for their rotation.

18. A cylinder head as set forth in claim 17 wherein the cam cover conduit has a first end portion on one side of the cavities communicating with a source of lubricant under pressure and a transversely extending portion extending from one side to the other for supplying lubricant to the camshafts.

*19. A valve arrangement as set forth in claim 3, wherein said plurality of camshaft bearings are formed by a first group of cooperating bearing surfaces on a single bearing cap and on said cylinder head.*

*20. A valve arrangement as set forth in claim 19, wherein said first group of bearing surfaces on said single bearing cap are spaced apart from one another along an axis which is generally parallel to an axis of rotation of said camshaft.*

*21. A valve arrangement as set forth in claim 19, wherein said single bearing cap comprises at least one conduit for supplying lubricant to at least one of said bearing surfaces of said single bearing cap.*

*22. A valve arrangement as set forth in claim 19 additionally comprising at least a second camshaft journaled for rotation about a second plurality of camshaft bearings, said second plurality of camshaft bearings being formed by a second group of cooperating bearing surfaces on said cylinder head and on said single bearing cap.*

*23. A valve arrangement as set forth in claim 22, wherein said single bearing cap comprises a first lubricant gallery communicating with a first set of delivery conduits, each delivery conduit of said first set supplying lubricant to one of said bearing surfaces of said first group, and a second lubricant gallery communicating with a second set of delivery conduits, each delivery conduit of said second set supplying lubricant to one of said bearing surfaces of said second group, said first and second lubricant galleries communicating with said third conduit means.*

*24. A valve arrangement as set forth in claim 23, wherein each set of delivery conduits is arranged in series along the length of a respective camshaft.*

*25. A valve arrangement as set forth in claim 23, wherein said camshafts are journaled within a cavity of said cylinder head and enclosed therein by said single bearing cap.*

*26. In combination, a cylinder head assembly for an engine defining a plurality of spaced bearing surfaces, a single bearing cap connected to said cylinder head assembly and having a plurality of spaced bearing surfaces which cooperate with said bearing surfaces of said cylinder head assembly, a first camshaft journaled for rotation about a first axis by a first plurality of bearings spaced apart from one another along said first axis, each bearing of said first*

*plurality of bearings being formed by said cooperating bearing surfaces on said cylinder head assembly and said single bearing cap, and a second camshaft journaled for rotation about a second axis by a second plurality of bearings spaced apart from one another along said second axis, each bearing of said second plurality of bearings being formed by said cooperating bearing surfaces on said cylinder head assembly and said single bearing cap.*

*27. The combination of claim 26, wherein each bearing surface on said cylinder head assembly and on said single bearing cap generally has an arcuate shape.*

*28. The combination of claim 26, wherein said cylinder head assembly defines a cavity in which said first and second camshafts are journaled and comprises a plurality of bosses which extend into said cavity and define said plurality of bearing surfaces, and said single bearing cap comprises a corresponding number of bosses which extend into said cavity generally opposite of said cylinder head bosses and define said bearing surfaces which cooperate with said bearing surfaces of said cylinder head bosses so as each pairing of bosses surrounds a portion of one of said camshafts.*

*29. The combination of claim 26, wherein each bearing surrounds at least a half of one of said camshafts.*

*30. The combination of claim 26, wherein said first camshaft operates as an intake camshaft and said second camshaft operates as an exhaust camshaft.*

*31. The combination of claim 26, wherein said single bearing cap forms a cam cover which encloses said first and second camshafts within said cylinder head assembly.*

*32. In combination, a cylinder head assembly for an engine defining on one side with an associated cylinder block a plurality of spaced combustion chambers and defining on an opposite side a plurality of spaced bearing surfaces, a plurality of flow passages formed in said cylinder head assembly each servicing at least one of said combustion chambers, a single bearing cap connected to said cylinder head assembly and having a plurality of spaced bearing surfaces at least some of which cooperate with said bearing surfaces of said cylinder head assembly, a first shaft journaled for rotation about a first axis by a first plurality of bearings spaced apart from one another along said first axis and cooperating with spaced bearing surfaces of said first shaft, said first shaft controlling the events of at least one flow passage associated with each of at least two adjacent combustion chambers, each bearing of said first plurality of bearings being formed at least in part by one of said bearing surfaces on said single bearing cap and cooperating with one of said spaced bearing surfaces of said first shaft, each bearing surface of said first shaft being associated with a respective one of said adjacent combustion chambers, and a second shaft journaled for rotation about a second axis by a second plurality of bearings spaced apart from one another along said second axis, each bearing of said second plurality of bearings being formed at least in part by one of said bearing surfaces on said single bearing cap.*

*33. The combination of claim 32, wherein each bearing of said first plurality of bearings is formed by cooperating bearing surfaces on said cylinder head assembly and said single bearing cap.*

*34. The combination of claim 33, wherein each bearing of said second plurality of bearings is formed by cooperating bearing surfaces on said cylinder head assembly and said single bearing cap.*

*35. The combination of claim 34, wherein said cylinder head assembly defines a cavity in which said first and second shafts are journaled and comprises a plurality of bosses which extend into said cavity and define said plurality of bearing surfaces, and said single bearing cap comprises a corresponding number of bosses which extend into said cavity generally opposite of said cylinder head bosses and define said bearing surfaces which cooperate with said bearing surfaces of said cylinder head bosses so as each pairing of bosses surrounds at least a portion of one of said shafts.*

*36. The combination of claim 32, wherein said first shaft comprises a camshaft.*

*37. The combination of claim 36, wherein said first shaft comprises a camshaft which operates as an intake camshaft, and said second shaft comprises a camshaft which operates as an exhaust camshaft.*

*38. The combination of claim 32, wherein said single bearing cap forms a cam cover which encloses said first and second camshafts within said cylinder head assembly.*

* * * * *